United States Patent [19]

Ghose

[11] Patent Number: 4,896,239
[45] Date of Patent: Jan. 23, 1990

[54] BI-COMPLIANT ROTOR STEPPER MOTOR FOR AN ACTUATOR IN A DISC DRIVE

[75] Inventor: Sanjoy Ghose, Santa Cruz County, Calif.

[73] Assignee: Seagate Technology, Inc., Scotts Valley, Calif.

[21] Appl. No.: 259,457

[22] Filed: Oct. 17, 1988

Related U.S. Application Data

[63] Continuation of Ser. No. 31,904, Mar. 30, 1987, abandoned.

[51] Int. Cl.[4] ........................ G11B 5/012; F16C 1/02
[52] U.S. Cl. ................................ 360/106; 360/98.07; 360/99.08; 384/536
[58] Field of Search .................. 360/106, 97.01, 98.07, 360/99.08; 384/536

[56] References Cited

U.S. PATENT DOCUMENTS

| 2,674,505 | 4/1954 | Pfenninger et al. | 384/536 |
| 3,015,932 | 1/1962 | McCard | 384/536 X |
| 4,011,589 | 3/1977 | Gitzendanner | 360/98 |
| 4,323,939 | 4/1982 | Iftikar et al. | 360/106 |
| 4,699,528 | 10/1987 | Gotman | 384/536 |

FOREIGN PATENT DOCUMENTS 56-49414A  6/1981  Japan .................................... 384/517

Primary Examiner—John H. Wolff
Attorney, Agent, or Firm—Flehr, Hohbach, Test, Albritton & Herbert

[57] ABSTRACT

This invention provides a technique for effectively floating the rotor of a disc drive motor, thereby permitting small motions in the axial (non-critical) direction while maintaining significant stiffness in the radial (critical) direction. This is achieved by providing an electromagnetic actuator including a stepper motor having a housing, a stator located within the housing, and a rotor positionable relative to the stator driving a motor shaft to wind and unwind a band and thereby position the carriage. The drive shaft passes through ball bearings which support the shaft for rotation. The ball bearings themselves fit within an annular end bell portion of the motor housing which defines a channel for the bearing. An injected elastomer forms a tight-fitting ring between the bearings and the internal wall of the end bell, thereby radially supporting the outer race of the bearing. Preload springs are then installed on both sides of the rotor between the internal end walls of the end bells and both outer races of the bearing. The installation of these springs effectively floats the rotor to allow some distortion or movement of the rotor in the axial direction, while minimizing or eliminating the radial deflection components.

4 Claims, 1 Drawing Sheet

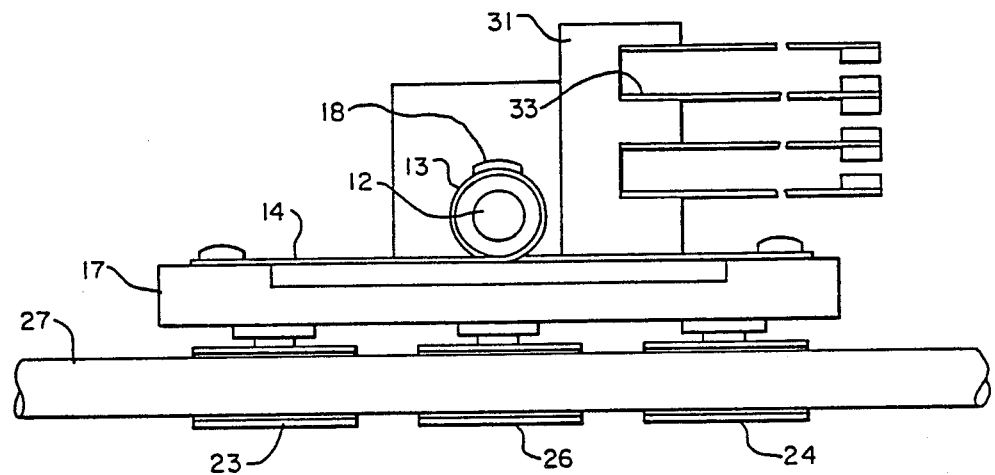
FIG. — 1
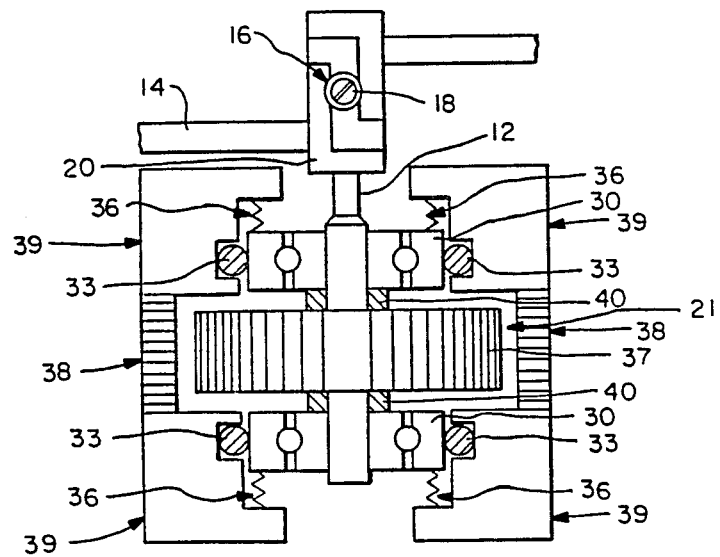
FIG. — 2

BI-COMPLIANT ROTOR STEPPER MOTOR FOR AN ACTUATOR IN A DISC DRIVE

This is a continuation of application Ser. No. 031,904 filed Mar. 30, 1987, now abandoned.

This invention relates generally to an improved motor for driving the head positioning assembly in a disc drive apparatus, and more particularly to a motor that has its rotor and drive shaft supported to diminish radial deflection of the shaft while permitting small axial deflections.

Disc drive machines record and reproduce information stored on concentric circular tracks recorded on magnetic discs. Tracks are written and read by magnetic heads that cooperate with the surface of the disc. Such systems in a typical popular version utilize a band drive to convert rotary motion of a stepper motor shaft to linear motion of a carriage which moves the heads mounted on the carriage radially across the disc to record and read adjacent concentric circular tracks. The drive band is wrapped around a motor shaft or a pulley attached to the shaft and has its ends attached to the carriage; rotation of the shaft wraps one end of the band on the pulley while unwrapping the other, causing the carriage to move linearly. Guide means are associated with the carriage to guide the carriage in its linear travel to insure that the heads move radially across the associated disc.

A new track is recorded at each step of the stepper motor. The spacing of the tracks is dependent upon the amount of rotation that the motor shaft undergoes with each step and the diameter of the pulley upon which the band is wound.

In the digital magnetic recording field, there is a demand for greater storage capability. Therefore, it is desirable to minimize the spacing between tracks and yet be able to recover the stored information by being able to locate a particular track for retrieval or writing. Even the small radial deflection of the motor drive shaft which may occur in use of the motor because of the radial pressure against the drive shaft caused by the band drive and the tolerances allowed for motor assembly and the wear of components can be as much as 200 microinches. This deflection load characteristic uses up the entire allowable margin for mistracking.

It is therefore highly desirable to more tightly bond the motor drive components in place to minimize the radial deflection of the drive shaft relative to the original alignment position of the shaft. An approach to this problem is described in application, Ser. No. 545,896 Oct. 27, 1983, now abandoned in the name of Doug Reim and assigned to the assignee of the present invention. This application, which is incorporated herein by reference, utilized a hardened ring of elastomer surrounding a ball bearing which is located at the end of the rotor nearer the band to minimize the radial deflection of the motor under the force exerted by the band. However, a problem which this invention does not overcome is that considerable lateral forces are exerted by the band, especially when it is fully wrapped. When the free length of the band is small, its lateral stiffness is very high due to the short length. Therefore, any lateral misalignment between the band and pulley causes large forces to be generated. This leads to high band stresses which can cause tearing or breaking of the band.

Therefore, an objective of this invention is to provide a stepper motor for a disc drive with an optimum level of repeatability of positioning of the head by the carriage.

This problem becomes apparent in motors which are heavily loaded or otherwise modified to prevent radial deflection of the shaft; large hysteresis problems can occur if the band is not perfectly aligned with the direction of motion of the carriage. A small misalignment can cause binding of the bearings or band breakage because of large forces generated due to lack of colinearity of the bands with the direction of motion at the ends of the stroke.

Therefore, it is an objective herein to provide a motor which includes means for inherently adjusting to small misalignment problems which may occur between the band and the direction of travel of the carriage.

This invention is especially significant because prior art attempts to satisfy the objectives of minimizing radial deflection of the motor has been directed primarily to axial loading of the motor, or as is now disclosed and claimed in the above-identified application to minimizing the radial movement of the bearings.

An objective of this invention is to provide a technique for effectively floating the rotor, thereby permitting small motions in the axial (non-critical) direction while maintaining significant stiffness in the radial (critical) direction. These and other objectives of this invention are achieved by providing an electromagnetic actuator including a stepper motor having a housing, a stator located within the housing, and a rotor positionable relative to the stator driving a motor shaft to wind and unwind a band and thereby position the carriage. The drive shaft passes through ball bearings which support the shaft for rotation. The ball bearings themselves fit within an annular end bell portion of the motor housing which defines a channel for the bearing. An injected elastomer forms a tight-fitting ring between the bearings and the internal wall of the end bell, thereby radially supporting the outer race of the bearing. Preload springs are then installed on both sides of the rotor between the internal end walls of the end bells and both outer races of the bearing. The installation of these springs effectively floats the rotor to allow some distortion or movement of the rotor in the axial direction, while minimizing or eliminating the radial deflection components.

These and other objectives and advantages of this invention will be more clearly understood from the following description and given in connection with the drawings in which:

FIG. 1 is an elevation view partially in section of a disc drive actuator incorporating a stepper motor and band; and, FIG. 2 is a sectional view of a stepper motor modified in accordance with the present invention and its connections to a typical band used to position a carriage within a disc drive.

U.S. Pat. No. 4,323,939 issued Apr. 6, 1982, entitled HARD FIXED DISC DRIVE ASSEMBLY AND READ/WRITE HEAD ACTUATOR and assigned to a common assignee describes a disc drive apparatus in which the present invention is useful; further details of the head positioning disc drive assembly may be found in U.S. Pat. No. 4,456,937 issued June 6, 1984, and assigned to a common assignee; the disclosures of these patents are incorporated herein by reference.

Referring to FIG. 1, the head actuator used in the disc drive and read/write head assembly is seen to comprise a stepper motor 10 having a drive shaft 12, and a pulley 13 carried at one end of the shaft 12 and adapted to receive a drive band 14. Band 14 includes a center portion secured by a screw 18 to the center of the pulley 13 that rotates on the drive shaft 12 of the motor 10. The other ends of the drive band are attached to the carriage 17. Rotation of the pulley 13 clockwise or counterclockwise winds and unwinds band portions on and off the pulley to move the carriage 17 and thereby the supported transducers relative to discs 21 to position the transducers relative to tracks on the discs 21.

Clearly, the open loop stepper motors typically used in these applications such as band actuator disc drives can have hysteresis problems if the band 14 is not perfectly aligned with the direction of motion of the carriage. Small misalignments can cause binding of the bearings within the motor, or and breakage because of large forces generated due to lack of colinearity at the ends of the stroke. This lack of colinearity puts significant shearing forces on the ends of the band 14 that are attached to the carriage 17, frequently resulting in band breakage. Therefore, this invention presents a technique for floating the rotor, permitting small motions in the axial (non-critical) direction while maintaining large stiffness in the radial (critical) direction. That is, the stepper motor as modified according to this invention is very flexible in the axial direction, and very stiff in the radial direction. As presently implemented in a preferred embodiment, the invention comprises an improvement over the above-incorporated application of Mr. Reim, et al. A stepper motor 10 such as is commonly employed in disc drives is shown in FIG. 2. Within motor housing 11, the motor rotor generally indicated at 37 is carried on a shaft 12 onto which are fixed the inner races of two bearings 30. Two spacer rings 40 serve to locate the rotor 37 on the shaft 12. The outer race of each of the bearings 30 is mounted in an endbell 39; the stator 38 is clamped between the endbells 39. The stepper motor is modified by drilling a channel in both of the end bells of the housing of the motor. Then the inner race of each of the bearings 30 is press fitted to the shaft 12.

After that step, preload springs 36 are installed between the ends of each of the bearings 30 and the inner wall of the end bells 39 of the motor housing. Finally, elastomer 33 is injected into the motor end bells in channels 34 to support the outer race of the bearings 30. This injected elastomer 33, forms rings surrounding the outer race of the bearings, and fills the space defined by the channels 34 between the motor housing 11 and the motor bearing.

The operation of the device is as follows: the elastomer 33 between the outer races of the bearings 30 and the inner wall of the end bells 39 prevents radial deflection of the rotor due to any applied force from the band or to the shock and vibration. This is because the elastomer is captured in the channel 34 in the end bell 39; therefore the outer race of the bearing 30 which defines one side wall of the channel 34 is held very stiffly in the radial direction. However, the rotor 37 can move in the axial direction in response to axially applied loads. This is because the elastomer 33 permits small axial motions; the two pre-load springs 36 oppose the applied loads to prevent excessive motion. Therefore, the rotor 38 can move in the axial direction to compensate for any misalignment or runout in the band and pulley system.

Without a floating rotor of the type described above, any misalignment results in binding of the rotor in the bearings, and consequently much higher hysteresis and wear. In addition, since by using this invention the band and the arm will no longer be opposing each other, it is apparent that band end breakage due to misalignment will be considerably reduced in the present invention. The band will move the motor rotor to the axial location to minimize misalignment. Therefore, the opportunity for accurate alignment between the band and the motor to which it is attached is maximized. Modifications and improvements to this invention may become apparent to a person of skill in the art who studies the invention disclosure. Therefore, the scope of this invention is to be limited only by the following claims.

What is claimed:

1. A stepper motor especially adapted for use in an actuator in a disc drive comprising a motor housing, a stator within the housing, a rotor movable relative to the stator and fixed to a motor shaft and responsive to pulses applied to said motor to drive said motor shaft, axially spaced ball bearings rotatably supporting said shaft, means fixedly supporting said ball bearings against radial direction comprising a ring of hardened elastomer surrounding said ball bearings and filling the radial spacing between the motor housing and the bearings outer race, and means resiliently supporting said bearings against axial deflection comprising preloaded spring means which are axially spaced and thus resiliently support the spaced ball bearings, thereby permitting small non-critical axial deflection of said motor shaft but restraining said shaft against deflection in the critical, radial direction.

2. An electromagnetic actuator as in claim 1 wherein said resilient support means comprise springs adjacent the outer end of said ball bearings at either end of said rotor.

3. In a disc drive having a carriage for positioning at least one magnetic head relative to a disc having radially spaced data tracks thereon, a stepper motor having a housing, a drive shaft carried by axially spaced ball bearings and positioned within an annular enclosed portion of the housing, a band coupled between said drive shaft and said carriage for positioning said carriage and transducer carried thereby relative to said disc, means for fixedly positioning the ball bearings against radial deflection toward said housing, said means for fixedly supporting said ball bearings comprising a ring of hardened elastomer surrounding each said ball bearing between an outer race of the ball bearing and the end bell of said housing and, means for resiliently loading said bearings in an axial direction to permit small non-critical axial deflection of said rotor and said bearings in response to forces applied to said band comprising preloaded spring means which are axially spaced and thus resiliently support the spaced ball bearings.

4. A disc drive as in claim 3 wherein said means for resiliently loading said bearings comprise preload springs located between outer races of said bearings and end bell walls of said housing.

* * * * *